(12) United States Patent
Goehlich et al.

(10) Patent No.: US 8,740,144 B2
(45) Date of Patent: Jun. 3, 2014

(54) PASSENGER SUPPLY ARRANGEMENT FOR AN AEROPLANE

(75) Inventors: Robert Alexander Goehlich, Hamburg (DE); Holger Frauen, Hamburg (DE); Cihangir Sayilgan, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 349 days.

(21) Appl. No.: 13/097,262

(22) Filed: Apr. 29, 2011

(65) Prior Publication Data

US 2011/0266392 A1 Nov. 3, 2011

Related U.S. Application Data

(60) Provisional application No. 61/329,576, filed on Apr. 30, 2010.

(30) Foreign Application Priority Data

Apr. 30, 2010 (DE) .......................... 10 2010 018 896

(51) Int. Cl.
*B64D 11/00* (2006.01)

(52) U.S. Cl.
USPC ......... 244/118.5; 244/1 R; 725/77; 297/217.3

(58) Field of Classification Search
USPC ..... 244/1 R, 118.5, 118.6, 122 R; 297/217.3, 297/217.4; 725/75, 76, 77
See application file for complete search history.

(56) References Cited

U.S. PATENT DOCUMENTS

| | | | |
|---|---|---|---|
| 3,379,488 A * | 4/1968 | Lancor, Jr. ......................... 352/6 |
| 3,457,006 A * | 7/1969 | Brown et al. ................. 352/132 |
| 3,795,771 A * | 3/1974 | Gundersen et al. ........... 370/242 |
| 4,352,200 A * | 9/1982 | Oxman ......................... 455/41.2 |
| 4,584,603 A * | 4/1986 | Harrison ......................... 725/76 |
| 4,639,106 A * | 1/1987 | Gradin ............................ 353/13 |
| 5,123,728 A * | 6/1992 | Gradin et al. ................... 353/78 |
| 6,619,605 B2 * | 9/2003 | Lambert .................. 248/226.11 |
| 7,057,811 B2 * | 6/2006 | Bruegl et al. ................. 359/443 |
| 7,489,303 B1 * | 2/2009 | Pryor ............................ 345/173 |
| 8,243,214 B2 * | 8/2012 | Park et al. ..................... 348/837 |
| 2005/0046755 A1* | 3/2005 | Hattori et al. ................. 348/837 |
| 2006/0181105 A1 | 8/2006 | Puschmann |
| 2007/0057122 A1 | 3/2007 | Lee |
| 2008/0024463 A1* | 1/2008 | Pryor ............................ 345/175 |
| 2009/0007194 A1* | 1/2009 | Brady et al. .................... 725/77 |

(Continued)

FOREIGN PATENT DOCUMENTS

| DE | 3719105 A1 | 12/1988 |
|---|---|---|
| DE | 102005002790 B4 | 8/2006 |

(Continued)

*Primary Examiner* — Benjamin P Lee
(74) *Attorney, Agent, or Firm* — Leydig, Voit & Mayer, Ltd.

(57) ABSTRACT

A passenger supply arrangement provides a communications system and comfort system for a passenger of an aeroplane. The passenger supply arrangement includes a presentation surface configured to be integrated into a backrest of a passenger seat of an aeroplane and a passenger supply module configured to be disposed above the passengers seats of the aeroplane. The passenger supply module includes at least one projector configured to project an image onto the presentation surface. The image includes a monitoring area for playback of video and an operating area for displaying and for actuation of operating elements of the passenger supply module.

13 Claims, 3 Drawing Sheets

(56) References Cited

U.S. PATENT DOCUMENTS

| | | |
|---|---|---|
| 2009/0013357 A1* | 1/2009 | Cassellia et al. ............ 725/75 |
| 2009/0288123 A1* | 11/2009 | Havlovick et al. ............ 725/77 |
| 2010/0087130 A1 | 4/2010 | Nitsche |
| 2010/0206985 A1 | 8/2010 | Rahlff |
| 2010/0231547 A1* | 9/2010 | Pryor ............................ 345/173 |
| 2011/0240796 A1* | 10/2011 | Schneider ................... 244/118.5 |

FOREIGN PATENT DOCUMENTS

| | | | |
|---|---|---|---|
| DE | 102007014406 B3 | 4/2008 | |
| DE | 102007030331 A1 | 1/2009 | |
| JP | 02003556 A | 1/1990 | |
| JP | 08070416 A * | 3/1996 | ............... H04N 5/64 |
| JP | 08070418 A * | 3/1996 | ............... H04N 5/74 |

\* cited by examiner

PASSENGER SUPPLY ARRANGEMENT FOR AN AEROPLANE

CROSS REFERENCE TO RELATED APPLICATIONS

This application claims priority to U.S. Provisional Patent Application No. 61/329,576, filed Apr. 30, 2010 and German Patent Application No. DE 10 2010 018 896.4, filed Apr. 30, 2010, both of which are hereby incorporated by reference herein in their entireties.

FIELD

The invention relates to a passenger supply arrangement for the provision of a communications system and a comfort system for an aeroplane passenger.

BACKGROUND

Modern passenger aeroplanes are typically equipped with a passenger-related comfort and service system. This is mounted in a separate so-called passenger supply module underneath the overhead lockers above the passenger seats, and usually comprises a reading light, a fresh air nozzle, and a service switch for establishing contact with the cabin staff. Power supply and data transfer takes place via a multiplicity of individual wires and ducts. Moreover long distance aeroplanes are in particular equipped with a passenger-related communications system. This usually comprises at least one video unit integrated in the backrest of the seat in front in the form of a monitor for purposes of image reproduction, and an audio unit as well as a control unit, for purposes of controlling the video and audio units, integrated in an armrest. To prevent any disturbance to adjacent passengers a set of headphones is provided that can be wired up to the control unit. The power supply and data transfer conventionally takes place via wiring laid in the aeroplane floor and corresponding wiring in the seats. Thus in an aeroplane that is equipped with comfort systems and communications systems of this kind, a multiplicity of power supply wires and data wires are arranged both in the aeroplane floor and in the seats and also in the vicinity of the overhead lockers, which makes the installation of the electrical and signal data wiring and the mounting of the seats very complex. Moreover any refitting, for example when altering the seat rows, is complex as a result of the complicated wiring. Furthermore the operation of the comfort system and the communications system is ergonomically non-optimal, since the relevant operating elements are spatially separated from one another, and are arranged both directly above the passenger and also directly at his/her side in the armrest.

To reduce the multiplicity of wires and to simplify the wiring in the seat area an aeroplane seat with a communications system is presented in DE 37 19 05 A1, in which the power supply is provided autonomously via an energy source such as a battery integrated into the seat, wherein one of the seat rails then serves as an electrical conductor. The battery solution has particular disadvantages in that the weight of each individual seat hereby increases markedly, which renders mounting significantly more difficult, and in that the battery must be monitored constantly with regard to its state of charge and ageing. The transfer of signal data, including the control of a set of headphones, takes place in a wireless manner via infrared or ultrasound, for example.

To reduce the number of external wires, and in particular to simplify the mounting of the overhead lockers, German patent application DE 10 2007 030 331 A1 describes a supply line of the comfort system, such as the power supply line for the reading light and a fresh air duct, integrally with the overhead lockers.

Moreover German patent DE 10 2005 002 790 B4 for purposes of increasing comfort describes a display element in the backrests of passenger seats for the presentation of items of information such as "no smoking" and "fasten seat belt" signals.

Nevertheless it is always necessary in the comfort and communications systems of known art to provide separate power supply and data lines at least in the overhead lockers area and internal to the seats, and typically in the aeroplane floor area also.

SUMMARY

An aspect of the present invention is to create a passenger supply arrangement for the provision of a communications system and a comfort system for an aeroplane passenger, which avoids the disadvantages cited above and, alongside simple mounting and rapid refitting and also simplified line installation, allows ease of operation.

In an embodiment, the present invention provides a passenger supply arrangement providing a communications system and comfort system for a passenger of an aeroplane. The passenger supply arrangement includes a presentation surface configured to be integrated into a backrest of a passenger seat of an aeroplane and a passenger supply module configured to be disposed above the passengers seats of the aeroplane. The passenger supply module includes at least one projector configured to project an image onto the presentation surface. The image includes a monitoring area for playback of video and an operating area for displaying and for actuation of operating elements of the passenger supply module.

BRIEF DESCRIPTION OF THE DRAWINGS

Exemplary embodiments of the present invention are described in more detail below with respect to the drawings, in which.

In the following figures the same design elements bear the same reference numbers, wherein where there is a plurality of the same design elements in one figure just one element is provided with a reference number in the interests of clarity.

DETAILED DESCRIPTION

Figure 1:
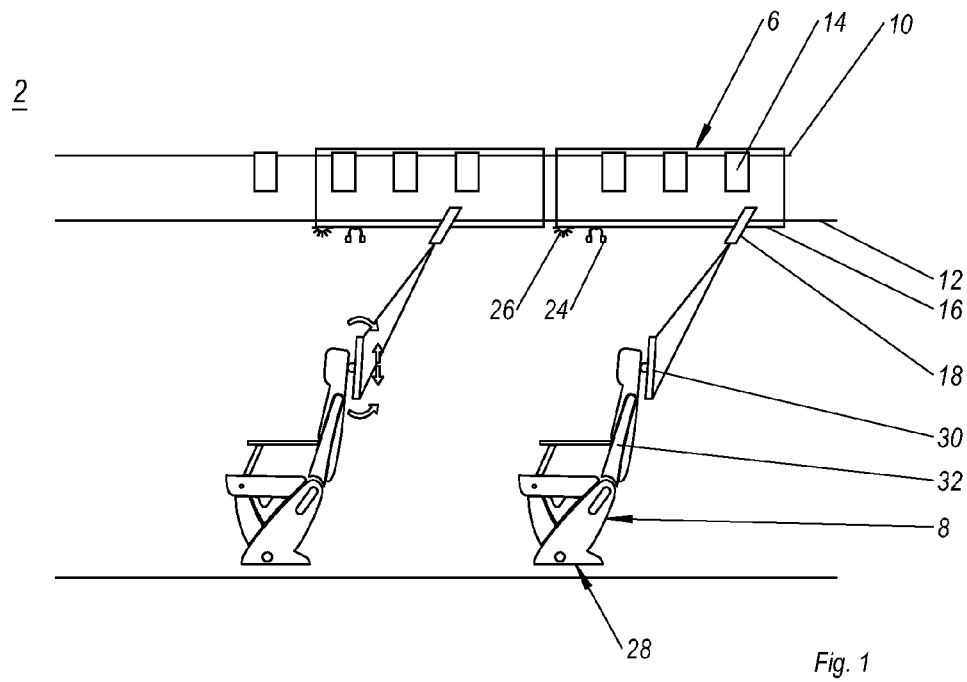
FIG. 1 schematically shows a side view of a passenger supply arrangement in accordance with an embodiment of the invention.

A passenger supply arrangement in accordance with an embodiment of the invention for the provision of a communications system and a comfort system for an aeroplane passenger has a passenger supply module that can be arranged above the passenger seats. Moreover it has a presentation surface that can be integrated into a backrest of a passenger seat, or into a cabin partition wall, for purposes of reproducing an image. The passenger supply module is provided with at least one projector for purposes of image projection, wherein the image has a monitoring area for the playback of video, and an operating area for the imaging and actuation of operating elements of the passenger supply module.

By means of the passenger supply arrangement the effort required to mount the seats is in particular reduced and any modification of the seat rows is simplified, since the image is transferred via a projector onto a seat-side presentation or projection surface, so that at least one means of power supply transfer and one means of data transfer to the seat as well as inside the seat, for purposes of conventional control of a monitor or display, can be dispensed with. Since all operating elements such as volume, programme selection, image contrast, image brightness, service switch and on-off switch for the reading light are positioned and/or projected at a site that is comfortable for the passenger to reach, operation is likewise ergonomically improved.

Mounting and refitting of the seats can be further optimized if the actuation of the operating elements takes place via optical recognition. By this means the seats can be designed without any form of wiring, which leads to a significant weight reduction of the seats at least. In this variant all wiring is led exclusively to the projector, i.e. to the passenger supply module, which radically simplifies the installation of the wiring. Moreover optical recognition has the advantage that actuation of the operating elements takes place in a more or less contact-free manner, as a result of which any contamination of the projection surface by the passengers is avoided, and moreover any pitching movements of the backrest as a result of actuating the operating elements are avoided. In one embodiment the operating elements are integrated as buttons into the backrest and are in each case provided with an RFID chip, so that in this embodiment a near-zero force actuation of the operating elements is likewise made possible. Here a reader unit, integrated in the passenger supply module, is provided for the reception and processing of the data transmitted by the RFID chips.

To compensate for the particular backrest position it is advantageous if the projection surface is mounted on the backrest or cabin wall such that it can pivot. In addition the projection surface can be adjustable in height. Alternatively or additionally the projector can also be provided with an automatic control system for purposes of accommodating an angle of incidence, a trapezoidal shape of image, and focus. Likewise the projector can alternatively or additionally be guided on the passenger supply module such that it can pivot.

The commissioning of the seats or seat rows can be further simplified and optimized if the passenger supply module is guided on at least one longitudinal rail extending in the longitudinal direction of the aeroplane, and can be fixed in position on the latter, for example via self-locking so-called snap-and-click connections, by means of a form fit. Alternatively, locking can also take place via connecting elements that can be displaced in the longitudinal direction on the basis of a friction fit; these fundamentally provide a higher degree of flexibility with regard to the arrangement of the passenger supply modules relative to one another than the form fit locking devices. Here for purposes of further reduction of the complexity of the wiring installation and for purposes of further weight reduction it is advantageous if the at least one longitudinal rail serves as a signal data and/or power supply conductor. Transfer of the signal data to the projector can, for example, take place via an appropriate optical fiber arrangement, sliding contacts, or in a wireless manner. The power supply to the projector can take place inductively, or likewise via sliding contacts.

To increase the level of comfort a set of wireless headphones is provided for at least each passenger; the headphones can be supplied with data and electrical power via a charging and holding station that is integrated in the passenger supply module. Here the headphones can be modified such that they can only be used in the vicinity of the particular aeroplane in question, so that if they are removed, they are inoperable, i.e. their functions are blocked. At the same time the charging and holding station acts as a mounting for the headphones so that the latter are securely stowed and always accessible for the passenger, as a result of which individual procurement by the cabin staff is unnecessary Installation and refitting of the seats can be further simplified if the passenger supply module is provided with a fresh air duct, and also with at least one fresh air nozzle per passenger, and with a connecting element that can be altered in length for the fabrication of a connection in terms of fluid between the fresh air ducts of adjacent passenger supply modules. By this means individual fresh air ducts do not have to be installed in the aeroplane structure. Furthermore at least one of the fresh air ducts is indirectly connected with a main duct of an air conditioning system via a flexible connecting element. The flexible, hose-like, connecting elements allow an arrangement of the passenger supply modules at differing distances from one another and thus at an optimal orientation to the seats or seat rows. In one embodiment the connecting elements also take on the function of a cover plate, by means of which the ability of dirt particles and similar to penetrate into an intermediate space between adjacent passenger supply modules by virtue of their lateral separation from one another is prevented. The connecting elements and the cover plate are thus executed in a multi-functional manner using an integral form of construction.

In one embodiment at least one passenger supply module is integrated into an overhead locker module, as a result of which cabin installation is further simplified and thus accelerated by virtue of the reduced number of components.

In accordance with the side view in FIG. 1 a passenger supply arrangement 2 in accordance with an embodiment of the invention for the provision of a communications system and a comfort system for an aeroplane passenger in an aeroplane cabin has at least one passenger supply module 6 that is arranged above the passenger seats 8.

Figure 2:
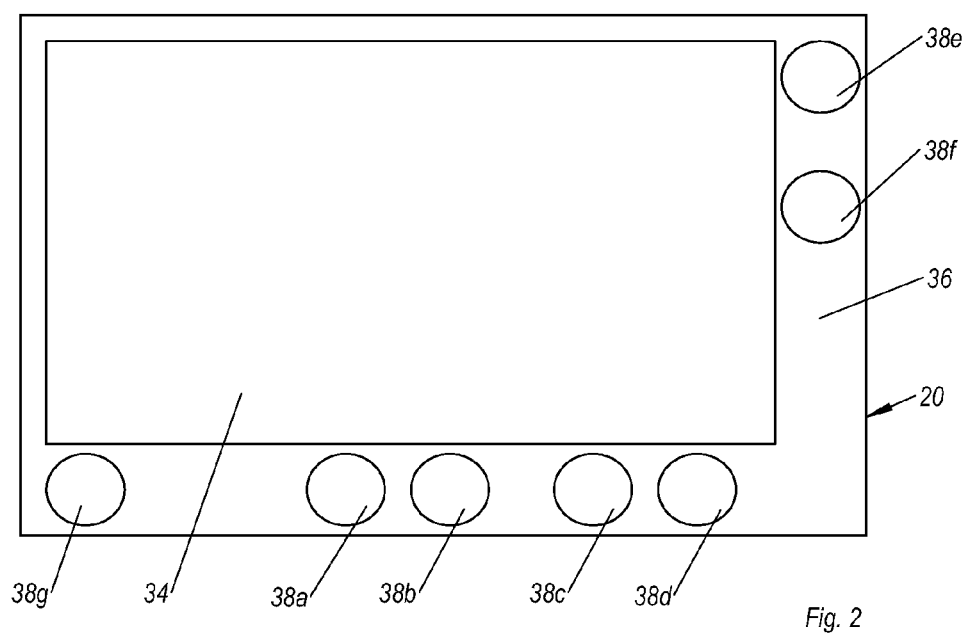
FIG. 2 shows a plan view onto a projection surface of the passenger supply arrangement.
Figure 3:
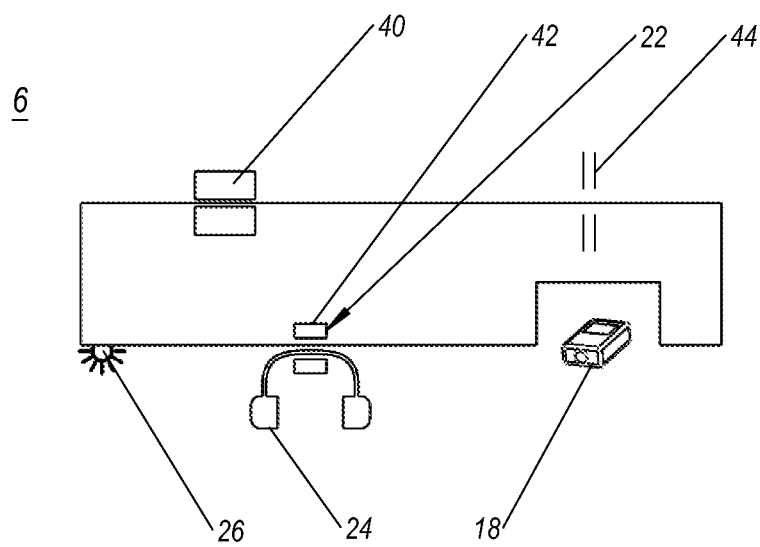
FIG. 3 shows a variant of a passenger supply module of the passenger supply arrangement.

The passenger supply modules 6 are guided on two parallel longitudinal rails 10, 12 such that they can be displaced in the longitudinal direction of the aeroplane, and can be fixed in position on the longitudinal rails 10, 12, at particular positions or locking points via form fit-based locking devices 14 such as, for example, snap-and-click connections. In the vicinity of a base panel 16 they have a projector 18 for purposes of projecting an image 20 as shown in FIG. 2, at least one charging and holding station 22 as shown in FIG. 3 for a set of headphones 24, and also at least one reading light 26. Also arranged in the base panel 16 is at least one fresh air nozzle for purposes of introducing fresh air into the passenger area in question.

One projector 18, one set of headphones 24, one reading light 26, and also one fresh air nozzle, are assigned to each passenger. The number of passenger supply modules 6 arranged one behind another in the longitudinal direction of the aeroplane corresponds to the number of seat rows 28, so that each passenger supply module 6 in accordance with the seats 8 of a seat row 28 has a corresponding number of projectors 18, headphones 24, and also charging and holding stations 22, reading lights 26, and fresh air nozzles. These are arranged adjacent to one another in a line in the lateral direction of the aeroplane, or, for reasons of space, slightly displaced relative to one another.

Moreover, the passenger supply arrangement 2 comprises a projection surface 30 per seat 8, i.e. per passenger, for purposes of presenting the image 20 projected by the projector 18, which projection surface is in each case integrated in the backrest 32 of the seats 8 of the seat row 28 in front, or, in the case of the first row of cabin class seats, in a cabin partition wall positioned in front of the first row of seats. The projection surface 30 can both be adjusted in height and also be pivoted about an axis running in the longitudinal direction of the aeroplane.

The projector 18 has an electrical control system, which allows automatic accommodation of at least one setting angle, a trapezoidal shape of image and focus to compensate for different positions of the backrest 32, so that in spite of varying angles and distances between the projection surface 30 and the projector 18 a constant height, unaltered image size and quality is achieved.

In accordance with FIG. 2 the image 20 has a rectangular monitoring area 34 for the playback of video, and also an operating area 36 surrounding the monitoring area 34 in the form of a frame for the arrangement of individual operating elements 38, such as program selection buttons 38a, 38b, volume controls 38c, 38d, an on-off switch 38e for the reading light 26, a service switch 38f for establishing contact with the cabin staff, as well as a menu button 38g. Moreover, the operating area 36 can contain information symbols such as "fasten seatbelt" and "no smoking" symbols. In this embodiment actuation of the operating elements 38 takes place optically. The operating elements 38 are projected by means of the projector 18 onto the projection surface 30 in the operating area 36, wherein optical actuation of the operating elements 38 takes place by screening by means of laser lines. In order to avoid thereby any unwanted triggering of a particular function such as volume alteration or program selection, for example as a result of arm movements in the vicinity of the screening, a certain period of time is preset for actuation of the marked operating elements 38.

The projection surface 30 consists of a surface material that enables an optimal reproduction of the image 20. Since all items of information for the playback of video and the operating elements 38 are projected onto the projection surface 30 per se, the latter does not possess any kind of wiring or corresponding information transmission and reception units. Accordingly, replacement of a damaged projection surface 30 can take place simply and quickly.

FIG. 3 shows a first variant of a means of power supply and data transfer for the passenger supply modules 6, i.e. for the units integrated into the latter, such as the at least one projector 18, and also the at least one charging and holding station 22 for the one or more sets of headphones 24. The power supply for the projector 18 and the reading light 26 takes place inductively via a system of coils 40, wherein one of the longitudinal rails 10, 12, not shown in this representation, serves as a current-carrying electrical conductor, and the other conductor is used for the return, so that no separate electrical wires have to be fed to or from the passenger supply modules 6. The power supply to the charging and holding station 22 likewise takes place inductively via a system of coils 42. The signal data supply take place via an optical fiber cable system 44, wherein an optical fiber cable system 44 is provided on the longitudinal rails 10, 12 at each locking point for the passenger supply modules 6.

Figure 4:
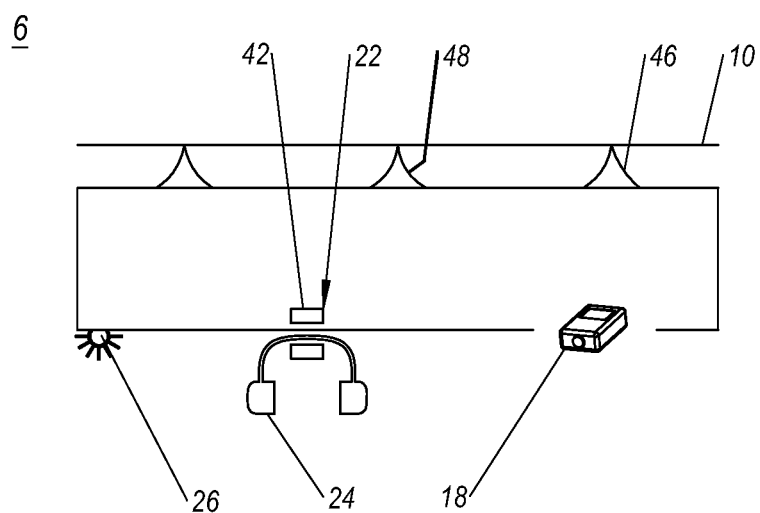
FIG. 4 shows another variant of a passenger supply module of the passenger supply arrangement.

In accordance with a second variant shown in FIG. 4 the power supply and data transfer can also take place via mechanical sliding contacts 46, which are electrically connected with at least one of the longitudinal rails 10 and are pre-loaded against the latter via spring elements, not shown. Likewise, the transfer of signal data or information can take place via corresponding spring pre-loaded sliding contacts 48.

Figure 5:
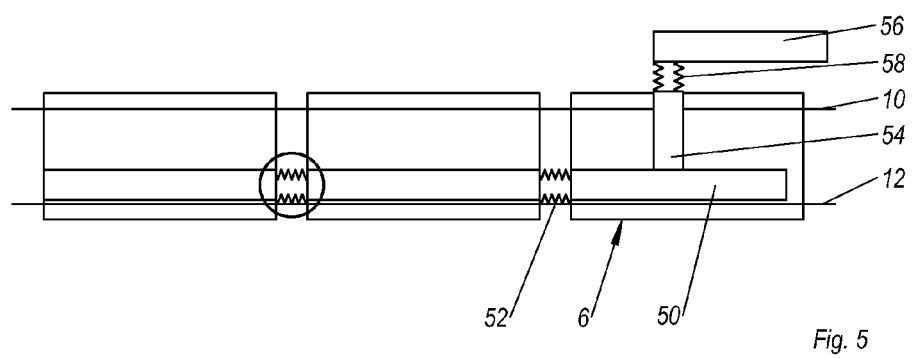
FIG. 5 shows a variant of a fresh air supply.
Figure 6:
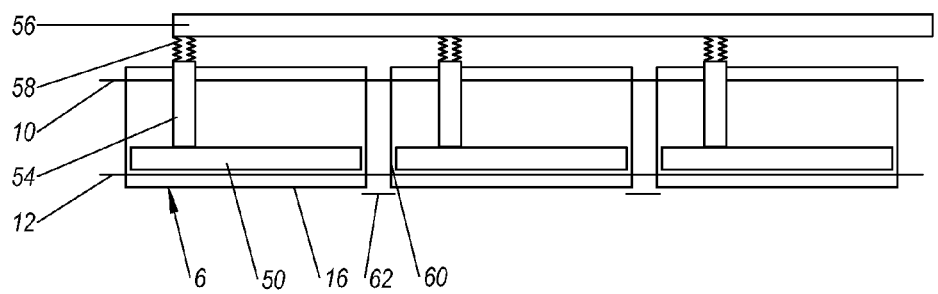
FIG. 6 shows another variant of a fresh air supply.

Likewise in accordance with FIGS. 5 and 6 a fresh air duct, 50, extending in the longitudinal direction of the aeroplane is in each case integrated into the passenger supply modules 6; this is connected in terms of fluid with the at least one fresh air nozzle integrated into the passenger supply modules 6.

In the first variant shown in FIG. 5 the adjacent fresh air ducts 50 are in each case connected at their ends with one another via a hose-like connecting element 52 enabling compensation for length, for example a bellows, so that the passenger supply modules 6 can be positioned on the longitudinal rails 10, 12 relative to one another at differing distances, and can thus be arranged optimally relative to the rows of seats 28. For the introduction of fresh air into the fresh air ducts 50 a connecting duct 54 is integrated in one passenger supply module 6, orientated orthogonally to the fresh air duct, for purposes of connecting with a main duct 56 of the air conditioning system of the aeroplane; this connecting duct is connected in terms of fluid with the fresh air duct 50 and is connected via a flexible, hose-type connecting element 58, such as a bellows, with the main duct 56.

In accordance with the second variant shown in FIG. 6, the fresh air ducts 50 can, however, also be closed at their ends, and can in each case have an individual orthogonal connecting duct 54 for the fabrication of a connection in terms of fluid with the main duct 56. In order to enable in this variant also a flexible arrangement of the passenger supply modules 6 at differing distances one behind another, a coupling of the connecting ducts 56 with the main duct 56 takes place in each case via a hose-like connecting element 58. To avoid contamination of an intermediate space 60 formed between the passenger supply modules 6 as a result of their lateral separation from one another a cover plate 62 is in each case arranged in the vicinity of the base panels 16, by means of which the intermediate space is closed off on the cabin side. Since in this variant each fresh air duct 50 is connected with the main duct 56, the latter extends over more or less the whole length of the longitudinal rails 10, 12, and not, as in the embodiment as per FIG. 5, over just a proportion of the longitudinal rails 10, 12.

Thus, an embodiment of the present invention provides a passenger supply arrangement for the provision of a communications system and a comfort system for an aeroplane passenger, with a passenger supply module that can be arranged above the passenger seats, and a presentation or projection surface that can be integrated into a backrest of a passenger seat, or into a cabin partition wall, wherein the passenger supply module has at least one projector for the projection of an image onto the projection surface, and wherein the image has a monitoring area for the playback of video, and an operating area for the display and actuation of operating elements of the passenger supply module.

REFERENCE SYMBOL LIST

2 Passenger supply arrangement
6 Passenger supply module
8 Seat
10 Longitudinal rail
12 Longitudinal rail
14 Locking device
16 Base panel
18 Projector 20 Image
22 Charging and holding station
24 Headphones
26 Reading light
28 Seat row
30 Projection surface
32 Backrest
34 Monitoring area
36 Operating area
38 Operating elements
40 System of coils for projector/reading light
42 System of coils for headphones
44 Optical fiber system
46 Power supply sliding contact
48 Signal data transfer sliding contact
50 Fresh air duct
52 Connecting element
54 Connecting duct
56 Main duct
58 Connecting element
60 Intermediate space
62 Cover plate

What is claimed is:

1. A passenger supply arrangement providing a communications system and comfort system for a passenger of an aeroplane having a plurality of passenger seats, the passenger supply arrangement comprising:
    a presentation surface configured to be integrated into a backrest of at least one of the passenger seats; and
    a passenger supply module configured to be disposed above the plurality of passengers seats, the passenger supply module including at least one projector configured to project an image onto the presentation surface, the image including a monitoring area for playback of video and an operating area for optically displaying operating elements of the passenger supply module, wherein the operating elements are configured to be actuated by optical recognition after a preset period of time.

2. The passenger supply arrangement recited in claim 1, wherein the presentation surface is pivotable.

3. The passenger supply arrangement recited in claim 1, wherein the presentation surface is height adjustable.

4. The passenger supply arrangement recited in claim 1, wherein the passenger supply module includes a fresh air duct, a fresh air nozzle, and a connecting element, the connecting element having an adjustable length and being configured to provide fluid communication to a fresh air duct of an adjacent passenger supply module.

5. The passenger supply arrangement recited in claim 4, wherein the fresh air duct is connectable to a main air duct of an air conditioning system of the aeroplane by the connecting element.

6. The passenger supply arrangement recited in claim 4, wherein the connecting element provides a cover plate configured to close intermediate space between the passenger supply module and an adjacent passenger supply module.

7. The passenger supply arrangement recited in claim 1, wherein the passenger supply module is integrated into an overhead locker module.

8. A passenger supply arrangement providing a communications system and comfort system for a passenger of an aeroplane having a plurality of passenger seats, the passenger supply arrangement comprising:
    a presentation surface configured to be integrated into a backrest of at least one of the passenger seats; and
    a passenger supply module configured to be disposed above the plurality of passengers seats, the passenger supply module including at least one projector configured to project an image onto the presentation surface, the image including a monitoring area for playback of video and an operating area for optically displaying operating elements of the passenger supply module, wherein the at least one projector includes a control system for automatically tracking the image.

9. A passenger supply arrangement providing a communications system and comfort system for a passenger of an aeroplane having a plurality of passenger seats, the passenger supply arrangement comprising:
    a presentation surface configured to be integrated into a backrest of at least one of the passenger seats; and
    a passenger supply module configured to be disposed above the plurality of passengers seats, the passenger supply module including at least one projector configured to project an image onto the presentation surface, the image including a monitoring area for playback of video and an operating area for optically displaying operating elements of the passenger supply module, wherein the passenger supply module is guided on a longitudinal rail, the passenger supply module being displaceable along the at least one longitudinal rail and lockable in place.

10. The passenger supply arrangement recited in claim 9, wherein the longitudinal rail is a conductor configured for at least one of signal data and power supply.

11. The passenger supply arrangement recited in claim 10, wherein the projector is configured to receive signal data by at least one of an optical fiber cable system, sliding contacts, and wireless communications.

12. The passenger supply arrangement recited in claim 10, wherein the projector is configured to receive the power supply by at least one of sliding contacts and by induction from a system of coils.

13. The passenger supply arrangement recited in claim 10, wherein the passenger supply module includes at least one charging and holding station for at least one set of wireless headphones, the station being configured to transmit data to the at least one set of headphones and to charge the headphones.

* * * * *